Aug. 4, 1936.   C. SCOTT   2,050,021
COMPOSITE FILM AND PICTURE AND METHOD OF PRODUCING IT
Filed June 22, 1932
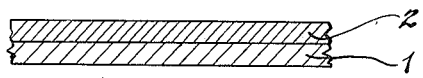
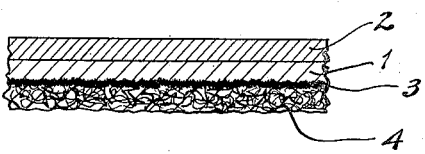
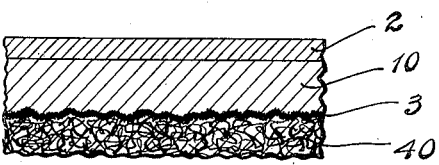
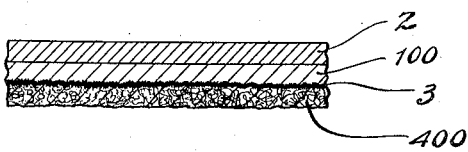
INVENTOR.
Clyde Scott.

Patented Aug. 4, 1936

2,050,021

UNITED STATES PATENT OFFICE 2,050,021

COMPOSITE FILM AND PICTURE AND METHOD OF PRODUCING IT

Clyde Scott, Newark, N. J.

Application June 22, 1932, Serial No. 618,813

7 Claims. (Cl. 41—22)

This invention seeks to render available, as a new article of manufacture, a composite film which is transparent, translucent or transpicuous to light, which is impervious to and insoluble in water as to all of its constituent parts, which, under normal conditions, is non-tacky and can be easily handled in sheets or rolls and stored indefinitely without deterioration, but which, by the mere application of heat and pressure, can be caused to adhere tenaciously and with complete uniformity to any desired sheets of paper or metal to protect, ornament or finish one or both sides thereof. This invention further contemplates, as a new article of manufacture closely simulating a true photograph, a mechanical print faced with a film of cellulose acetate by means of an invisible bond of an exceedingly intimate and permanent nature to develop a pronounced depth of tone and to render more vivid the normal color value of the printed ink. This invention also has in objective a new method of making the aforesaid film and a new method of manufacturing simulated photographs.

To enable those skilled in the art to put either or all of these objectives into effect, a detailed explanation of a typical application of each will now be given.

The composite film is made by producing, on a conventional film of cellulose acetate, a non-tacky skin characterized by an ability to flow freely under a heat and pressure lower than that which would affect the cellulose acetate. As a base constituent for such a skin, I propose a thermo-plastic synthetic resin. This preferably is polymerized vinyl acetate or chloride, a synthetic material readily available at the present time. This material is dissolved in a solvent which, while compatible for the synthetic resin, will not affect the cellulose acetate at normal pressures and temperatures. Such a solvent is toluol in which the synthetic resin may readily be dissolved, preferably to the extent of forming a solution containing about 20% of the resin. This solution is then filtered to clear it from any possible sediment and there results a free flowing water white liquor.

This liquor is then appropriately applied to a sheet of cellulose acetate; the manner of application being optional, as by spraying roll-coating, brushing or dipping. The amount applied will, of course, be governed by the ultimate usage to which the film will be put; the object being to obtain a skin of sufficient and no greater thickness than need be. For average purposes, the objective will be about .001 of an inch. The solvent is evaporated from the liquid coating, spontaneously if desired, but preferably, for the sake of expedition, by exposure to a moderate heat having a temperature below the melting point of both the resin and the sheet.

The resulting product will be a thin sheet or film of cellulose acetate having an invisible thin layer or skin of thermo-plastic polymerized resin. It is important to note that this skin is not in the least tacky and, in fact, resembles in appearance and feel the cellulose acetate itself. It is not affected by water or dampness and may be stored for future handling either in the form of rolls or stacks. As an article of manufacture it lends itself to any uses by reason of its capacity for being caused to adhere tenaciously and permanently to any given base; merely by the application of sufficient heat and pressure to fuse the skin. It may be made as a ribbon and used as an adhesive tape.

With this material in hand, it becomes possible to achieve the further important objects of my invention; to wit, the simulated photograph and its method of production. Through various well known photo-mechanical printing methods, attractive pictures are being produced at the present time. While these represent the best work now commercially possible, as a substitute for true photographs, they are easily distinguishable from originals. But, by starting with these inexpensive prints, and subjecting them to the treatment herein described, they can, with but little expense, be brought into closer resemblance to a true photograph; so closely, in fact, as to serve many purposes which are still being filled by photographs. To do this, is only necessary to establish contact between the face of the printed picture and the coated face of my composite film, and, through the application of heat and pressure, to bring about a uniform adhesion. The character of this adhesion, by reason of the thermo-plastic characteristics of the polymerized resin, materially differs from adhesions as ordinarily produced. In this case, the adhesion exhibits the characteristics of a transparent weld; being exceedingly intimate and producing almost unitary articles. While the amount of pressure is subject to variation, my experiments have indicated that, to produce the best results, it should be at about 250 lbs. per square inch; the temperature being between the melting points of the two constituent materials of my composite film. The pressure, of course, may be produced by platens, or continuously between rollers, in which latter case the heating contact is, of course, momentary and instantaneous. This results in establishing an effective bond or weld between the film and the nearer surface of a sheet of paper, fabric or the like, upon which the print appears. When bonding takes place in this manner, there is no alteration or chemical change in either the film or the synthetic skin. They are inseparable from the paper by any physical, chemical or mechanical means short of actual destruction. The product is thus an integral one and where the paper fiber is removed the printing remains on the coated surface or skin of the film. A peculiarity important for the attainment of the highest quality of appearance is that the heat should be applied through the back of the printed picture, and preferably by heating the platen or roller which supports the picture; it being unnecessary to heat the platen or roller which applies the counter pressure to the composite film. When the heat is thus supplied from the direction of the print it can be controlled to render the skin resin plastic to the desired extent and with the minimum risk of detriment to the cellulose acetate film or making the latter itself plastic. This process lends itself readily to a wide variety of printed materials, i. e. either fine or coarse grained paper, cloth, metal-foil etc. Either or both sides may be finished, water and fire-proofed and stiffened by employing my film in suitable thicknesses; or to accentuate outstanding features of the picture, it may be applied only to such parts thereof. For coarse-grained textures, it is desirable to use a film having a somewhat thicker skin of adhesive, than for ordinary prints.

In the accompanying drawing which forms a part of this specification, Figure 1 is a diagrammatic sectional view upon an exaggerated scale of a composite film embodying one example of my invention, showing a protective film base of translucid cellulosic material surfaced on one side with a thin adherent skin of translucid thermoplastic and fusible synthetic resin. Figures 2 to 4 inclusive are similar views with modifications, and show said composite film welded to a base material bearing an impressed design; and Figure 5 is a view of said film after same has been welded to the base material and the design and the base material removed therefrom.

Like numerals of reference indicate the like parts throughout the several figures in which 1, 10 and 100 is a heat-sensitive and pressure-sensitive skin of translucid thermoplastic and fusible synthetic resin or the like adapted for welding. 2 designates an attached coextensive protective film of translucid material. 3 designates an ink design or a decoration carried by a base member 4 and permanently affixed to the composite film. 4 designates a base member, 40 designates a coarse grained fibrous base material and 400 designates a fine grained base material.

The film shown in Figure 1 is specifically claimed in a divisional application filed by me November 8, 1935, Serial No. 48,869. In Figures 2, 3 and 4 I have shown the skin 1, 10 and 100 as a solid continuous unbroken lamina intimately bonded to the film of protective base material 2 and to and through the ink design 3 to the base materials 4, 40 and 400 respectively. The relative thickness of the skin 1 can be varied as shown in 10 and 100 to compensate for the texture of the base material employed thus insuring against imperfections in the welded composite article, and to insure faithful transfer of the ink design as well as for the purpose of developing depth or third dimensional effects. In Figure 5 there is disclosed a composite film showing a construction analogous to that in Figure 1 which has been welded to a base material bearing an ink design 3, said film being adapted to retain said design even after the removal of said base. In Figure 5 said material has been removed from said film, the ink design 3 being retained by said film.

While this process is applicable to practically all types of printed matter, it is requisite to the beauty of the result that ink of good quality should be used. It should not smear, (or bleed) nor spread at the edges, nor tinge the paper, and it should be permanent in color and appearance. All of the constituent parts of the composite film and the paper exert a mutual action upon the ink. The distinctive result of the reaction is to make the ink more vivid, giving it greater color value, greater and more pronounced depth and in a sense the illusion of a third dimension. When my method is carefully and accurately employed every character, whether it be type, heading, half tone, or line etching, will transfer faithfully.

By my process, artistic reproductions printed in color photogravure offer opportunities for richer color effects than are now possible by any other means. These prints become impressionistic facsimile reproductions. They reproduce the realism of the original photograph, they retain their inky attractiveness and yield all the colors. They render effects of light and shade to bring out the necessary accent, or to suggest color or depth of shade.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of United States:

1. A flexible composite structure consisting of a fibrous base member, a legible ink design carried by the base member, a coextensive transparent skin of fusible thermoplastic polymerized vinyl compound covering said base member and the design and intimately bonded to the ink design and to the fibrous base member, and a coextensive translucid member covering the transparent skin, said translucid member being intimately bonded to said transparent skin.

2. A flexible composite structure consisting of a fibrous base member, a legible ink design carried by the base member, a coextensive thin skin of a translucid thermoplastic and fusible synthetic resin covering said base member and the design and intimately bonded to the ink design and to the fibrous base member, and a coextensive translucid cellulose acetate member covering the resinous skin, said cellulose acetate member being intimately bonded to said resinous skin.

3. A simulated photograph comprising a fibrous base member, a legible ink design carried by the base member, a coextensive skin of substantially optically indistinguishable solid and substantially permanently adherent fusible thermoplastic vinyl compound covering said base member and the design and being intimately bonded to the ink design and to the fibrous base member, and a coextensive cellulose acetate member covering the transparent skin, said cellulose acetate member being intimately bonded to said transparent skin.

4. A simulated photograph comprising a fibrous base member, a legible ink design carried by the base member, a coextensive thin solid unbroken continuous skin of substantially optically indistinguishable and permanently adherent translucid thermoplastic and fusible synthetic resin covering said base member and the design and being intimately bonded to the ink design and to the fibrous base member, and a coextensive translucid member covering the resinous skin, said translucid member being intimately bonded to said resinous skin.

5. The art of embellishing a mechanical print comprising an ink design carried by a base member to develop a pronounced depth of tone, to brighten and render more vivid the normal color values of the printed ink, and to render same substantially water-proof and damp-proof which consists in applying thereupon a protective film of translucid material, said translucid material being surfaced on the side in contact with the printed ink with a permanently adherent thin skin of a translucid thermoplastic and fusible synthetic resin having a lower melting point than that of said translucid material, said skin being further characterized by an ability to unite with, take up and retain printed ink when subjected to the influence of heat and pressure, and uniting said resin to the ink and to the base by fusion under a pressure and a temperature sufficient to render the resin substantially permanently adherent to the base and to the ink, said temperature being below that of the fusing point of the said translucid material.

6. The method of making simulated photographs which consists in evenly applying to an area of a base sheet of translucid material a fluid solution of fusible thermoplastic transparent polymerized vinyl compound having a lower melting point than that of said translucid material and then exposing the coated sheet to an atmosphere the temperature of which is below that of the melting point of both the translucid protective base sheet and the vinyl compound and then pressing together the printed face of a mechanical print comprising an ink design carried by a base member and the coated side of said base sheet under a temperature sufficient to render the vinyl compound permanently adherent to said member and to the ink, said vinyl compound being adapted to form a solid unbroken continuous adherent lamina between said base sheet and said print.

7. The method of making simulated photographs which consists in evenly applying to an area of a base sheet of translucid material a fluid solution of a translucid thermoplastic and fusible synthetic resin, said solution being substantially without dissolvent action upon said base sheet, and then exposing the coated sheet to an atmosphere the temperature of which is below that of the melting point of both the base sheet and the translucid resin and then pressing together the printed face of a member carrying an ink design and the coated side of said base sheet under a temperature and a pressure sufficient to render the translucid resin permanently adherent to the member and to the ink without adversely affecting said member, ink or translucid base material.

CLYDE SCOTT.